US011095818B2

(12) United States Patent
Tani et al.

(10) Patent No.: US 11,095,818 B2
(45) Date of Patent: Aug. 17, 2021

(54) VIBRATION GENERATION DEVICE AND VIBRATION CONTROL METHOD

(71) Applicant: SONY CORPORATION, Tokyo (JP)

(72) Inventors: Atsushi Tani, Tokyo (JP); Takeo Kishida, Chiba (JP); Nobuyuki Kodama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/758,037

(22) PCT Filed: Aug. 6, 2018

(86) PCT No.: PCT/JP2018/029411
§ 371 (c)(1),
(2) Date: Apr. 21, 2020

(87) PCT Pub. No.: WO2019/087504
PCT Pub. Date: May 9, 2019

(65) Prior Publication Data
US 2020/0322517 A1 Oct. 8, 2020

(30) Foreign Application Priority Data
Oct. 30, 2017 (JP) .............................. JP2017-208798

(51) Int. Cl.
H04N 5/232 (2006.01)

(52) U.S. Cl.
CPC ................................ *H04N 5/2328* (2013.01)

(58) Field of Classification Search
CPC ........ H04N 5/2328; H04N 5/00; H04N 5/225; H04N 5/232; G03B 17/38; G03B 17/18
USPC ....................................................... 348/208.7
See application file for complete search history.

(56) References Cited

U.S. PATENT DOCUMENTS

| 8,767,079 | B2 * | 7/2014 | Yamazaki | .......... | H04N 5/23248 |
| | | | | | 348/208.2 |
| 9,651,850 | B2 * | 5/2017 | Chu | ...................... | G03B 17/561 |
| 9,667,870 | B2 * | 5/2017 | Cheong | .............. | H04N 5/23222 |
| 2008/0296072 | A1 * | 12/2008 | Takashima | .............. | G06F 3/016 |
| | | | | | 178/18.01 |

(Continued)

FOREIGN PATENT DOCUMENTS

| CN | 101470314 A | 7/2009 |
| JP | 2000-321612 A | 11/2000 |

(Continued)

OTHER PUBLICATIONS

International Search Report and Written Opinion of PCT Application No. PCT/JP2018/029411, dated Sep. 25, 2018, 10 pages of ISRWO.

*Primary Examiner* — Pritham D Prabhakher
(74) *Attorney, Agent, or Firm* — Chip Law Group

(57) ABSTRACT

A vibration generation device capable of feeding back execution of image capturing to an image capturing person without affecting hand-shake correction control includes a vibration unit that generates vibration and a vibration control unit that performs vibration control on the vibration unit. In accordance with image capturing operation of an image capturing device, the vibration control unit causes the vibration unit to generate vibration at a second frequency band different from a first frequency band that the image capturing device has as a vibration range used for hand-shake correction control.

18 Claims, 12 Drawing Sheets

(56) References Cited

U.S. PATENT DOCUMENTS

| | | |
|---|---|---|
| 2009/0160953 A1 | 6/2009 | Nagata et al. |
| 2010/0225773 A1* | 9/2010 | Lee .................... H04N 5/23219 |
| | | 348/222.1 |
| 2011/0157380 A1* | 6/2011 | Yamazaki ............ H04N 5/2328 |
| | | 348/208.4 |
| 2012/0050324 A1* | 3/2012 | Jeong ....................... H04N 1/21 |
| | | 345/633 |
| 2014/0104453 A1* | 4/2014 | Fujinawa .............. H04N 5/2251 |
| | | 348/222.1 |
| 2014/0210601 A1* | 7/2014 | Sato ........................ G06F 3/041 |
| | | 340/407.2 |
| 2015/0103194 A1* | 4/2015 | Takeuchi ........... H04N 5/23258 |
| | | 348/208.6 |
| 2015/0125140 A1* | 5/2015 | Ashizawa .............. H02N 2/163 |
| | | 396/125 |
| 2016/0180879 A1* | 6/2016 | Ullrich ..................... H04N 9/79 |
| | | 386/201 |
| 2016/0306264 A1* | 10/2016 | Chu ....................... F16M 11/28 |
| 2017/0105190 A1* | 4/2017 | Logan ................. H04M 19/047 |
| 2017/0185151 A1* | 6/2017 | Pahud ..................... G06F 3/016 |
| 2018/0096754 A1* | 4/2018 | Song ........................ G03B 5/04 |
| 2018/0113512 A1* | 4/2018 | Kang ................. G06F 3/04817 |

FOREIGN PATENT DOCUMENTS

| | | |
|---|---|---|
| JP | 2005-173038 A | 6/2005 |
| JP | 2006-033597 A | 2/2006 |
| JP | 2006-136865 A | 6/2006 |
| JP | 2008-193195 A | 8/2008 |
| JP | 2009-038421 A | 2/2009 |
| JP | 2009-156910 A | 7/2009 |
| JP | 2010-160174 A | 7/2010 |

* cited by examiner

VIBRATION GENERATION DEVICE AND VIBRATION CONTROL METHOD

CROSS REFERENCE TO RELATED APPLICATIONS

This application is a U.S. National Phase of International Patent Application No. PCT/JP2018/029411 filed on Aug. 6, 2018, which claims priority benefit of Japanese Patent Application No. JP 2017-208798 filed in the Japan Patent Office on Oct. 30, 2017. Each of the above-referenced applications is hereby incorporated herein by reference in its entirety.

FIELD

The present disclosure relates to a vibration generation device, a vibration control method, and a computer program.

BACKGROUND

In an image capturing device, vibration is generated by a mirror, a shutter, and the like during exposure, which generates blur in a captured image in some cases. To handle such a situation, some image capturing devices have a hand-shake correction function to correct vibration generated during exposure.

Some other image capturing devices include an electronic shutter or the like to prevent generation of vibration due to a mirror, a shutter, and the like. In such an image capturing device, vibration is not generated during image capturing from mechanisms such as a mirror, a shutter, and the like included in the image capturing device. However, with such an image capturing device, an image capturing person sometimes cannot recognize whether image capturing is performed.

In a method, execution of image capturing is audibly fed back to the image capturing person by, for example, generating sound from a speaker or the like at the image capturing so that the image capturing person can recognize the image capturing. However, such a method invalidates quietness as an advantage of an image capturing device employing an electronic shutter, and thus encumbers image capturing in an environment in which quietness is required.

In another feedback method different from the audio feedback, execution of image capturing is visually fed back to the image capturing person through a display device such as a display. However, in this method, the display device is used to cause the image capturing person to recognize image capturing, and thus the image capturing person can only intermittently recognize an object. In addition, the image capturing person sometimes performs image capturing without seeing the display, and thus the image capturing person cannot accurately recognize image capturing with this method.

For example, Patent Literature 1 discloses a technology of causing the image capturing person to recognize image capturing through haptic feedback instead of the audio feedback and the visual feedback as described above. Specifically, Patent Literature 1 discloses a technology of reproducing, with a digital camera or the like by using a vibration generation device that generates a plurality of kinds of vibration, a touch feeling as if image capturing is performed through a shutter operation of a single-lens reflex camera or the like, and providing haptic feedback to the image capturing person to cause the image capturing person to recognize the image capturing.

CITATION LIST

Patent Literature

Patent Literature 1: JP 2006-136865 A

SUMMARY

Technical Problem

However, the technology disclosed in Patent Literature 1 feeds back the execution of image capturing to the image capturing person by generating vibration that would generate blur in a captured image. Thus, in the technology disclosed in Patent Literature 1, vibration generated by the vibration generation device potentially affects image blur correction by hand-shake correction control.

Thus, a technology of feeding back execution of image capturing to an image capturing person without affecting hand-shake correction control has been desired.

Solution to Problem

According to the present disclosure, a vibration generation device is provided that includes:
a vibration unit configured to generate vibration; and
a vibration control unit configured to perform vibration control on the vibration unit, wherein
in accordance with image capturing operation of an image capturing device, the vibration control unit causes the vibration unit to generate vibration in a second frequency band different from a first frequency band that the image capturing device has as a vibration range used for hand-shake correction control.

Moreover, according to the present disclosure, a vibration generation method is provided that is executed by a processor, the method includes controlling, in accordance with image capturing operation of an image capturing device, a vibration unit at a second frequency band different from a first frequency band that the image capturing device has as a vibration range used for hand-shake correction control.

Moreover, according to the present disclosure, a computer program is provided that is configured to cause a computer to function as a vibration control device configured to output a vibration instruction at a second frequency band different from a first frequency band that an image capturing device has as a vibration range used for hand-shake correction control.

According to the present disclosure, it is possible to generate vibration not used for hand-shake correction control and having a frequency different from a frequency that an image capturing device has for vibration corrected through hand-shake correction control.

Advantageous Effects of Invention

According to the present disclosure, it is possible to feed back execution of image capturing to an image capturing person without affecting hand-shake correction control.

The above-described effect is not necessarily restrictive, but any effect indicated in the present specification or any other effect that could be understood from the present specification may be achieved together with or in place of the above-described effect.

DESCRIPTION OF EMBODIMENTS

Figure 1:
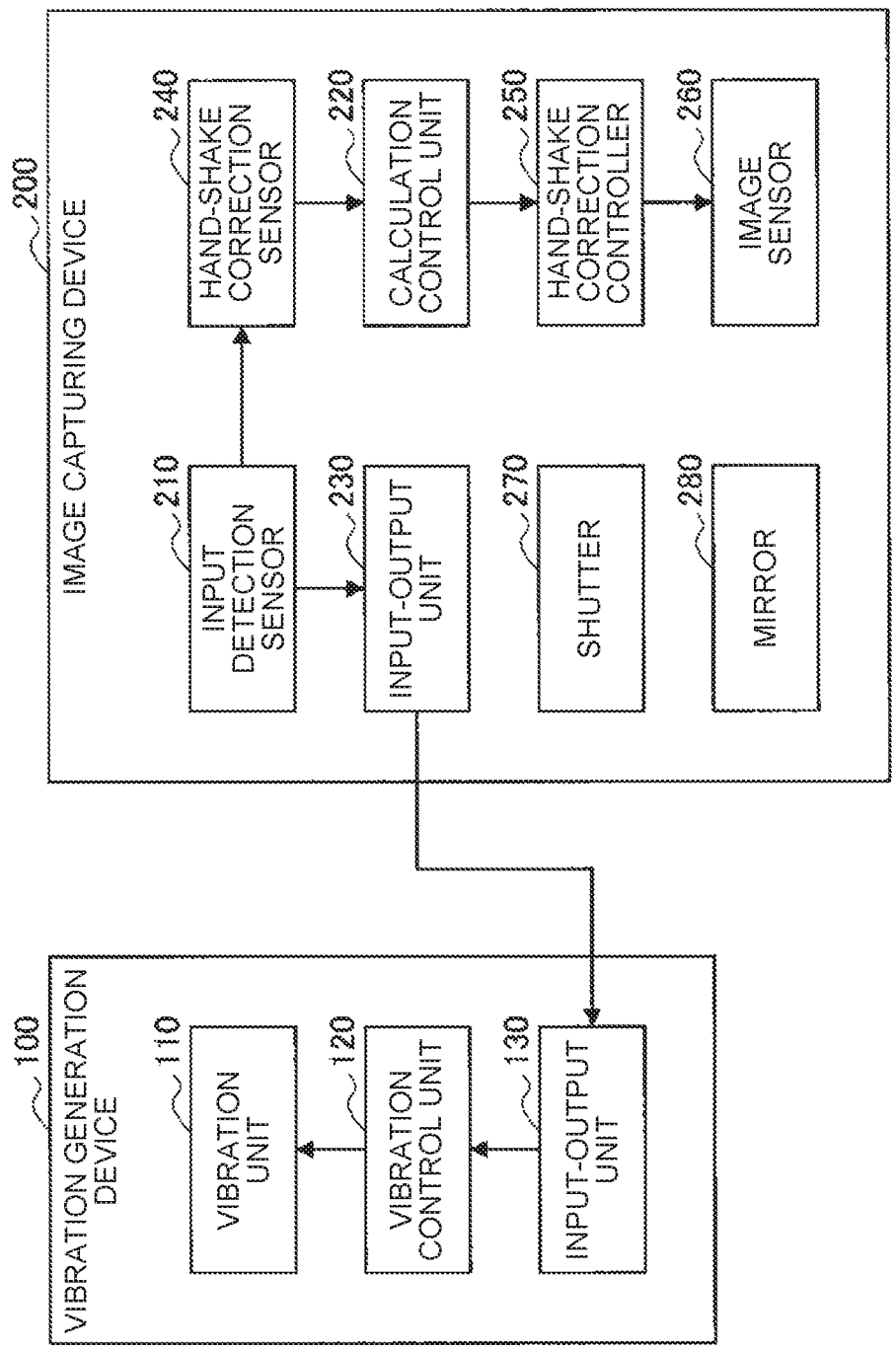
FIG. 1 is a diagram illustrating the function and configuration of a vibration generation device according to an embodiment of the present disclosure.

Preferred embodiments will now be described with reference to the accompanying drawings. Throughout the specification and drawings, components having substantially identical configurations are denoted with the same reference numerals, and a redundant description therefor will be omitted.

The following description will be performed in an order as follows.

Embodiment

1. Function and configuration of vibration generation device
2. Specific example of vibration control
3. First exemplary application
4. Second exemplary application

Embodiment

1. Function and Configuration of Vibration Generation Device

The following first describes the function and configuration of a vibration generation device according to an embodiment of the present disclosure with reference to FIG. 1. As illustrated in FIG. 1, a vibration generation device 100 according to the present embodiment includes a vibration unit 110, a vibration control unit 120, and an input-output unit 130.

The vibration generation device 100 generates vibration in accordance with image capturing operation. Thus, with reference to FIG. 1, the description will be also performed on the function and configuration of an image capturing device 200 to which the image capturing operation is input. The image capturing device 200 includes an input detection sensor 210, a calculation control unit 220, an input-output unit 230, a hand-shake correction sensor 240, a hand-shake correction controller 250, and an image sensor 260.

In the present embodiment, what is called an image-sensor shift scheme in which hand shake is corrected by moving an image sensor is an exemplary hand-shake correction scheme.

Components included in the vibration generation device 100 and the image capturing device 200 according to the present embodiment do not necessarily need to be physically connected with each other. For example, the input-output unit 130 and the input-output unit 230 in FIG. 1 may transmit and receive information to and from each other through communication.

The following first describes the configuration and function of the image capturing device 200 configured to sense inputting of the image capturing operation with reference to FIG. 1.

(Input Detection Sensor 210)

The input detection sensor 210 has a function to detect the image capturing operation input by an image capturing person and output an input detection signal to the input-output unit 230 and the hand-shake correction sensor 240. For example, the input detection sensor 210 is provided in a switch or shutter button (not illustrated) provided to the image capturing device 200. The switch or shutter button may include various sensors such as an acceleration sensor, a gyro sensor, and a pressure sensor. When the switch or shutter button includes a pressure sensor, for example, the pressure sensor is built in the shutter button or the like, detects pressure when the shutter button is pressed down, and performs input detection of the image capturing operation performed by the image capturing person. The image capturing operation includes, for example, operation of pressing down the shutter button (also referred to as a release button; not illustrated) or operation of turning on a camera and starting image capturing preparation.

(Input-Output Unit 230)

The input-output unit 230 includes a function to input and output information to and from the input-output unit 130 of the vibration generation device 100. Specifically, the input-output unit 230 according to the present embodiment outputs the input detection signal detected by the input detection sensor 210 to the input-output unit 130 of the vibration generation device 100. The input-output unit 130 may perform acquisition and outputting of information by performing communication, for example, in a wired or wireless manner.

For example, the input-output unit 230 may be a port, such as a universal serial bus (USB) port, an IEEE1394 port, a small computer system interface (SCSI), an RS-232C port, or an optical audio terminal, through which an external connection instrument is connected.

(Hand-Shake Correction Sensor 240)

The hand-shake correction sensor 240 has a function to detect hand shake of the image capturing device 200, collect the hand shake data, and output the hand shake data to the calculation control unit 220. The hand shake data is information related to the direction or degree of the hand shake and is, for example, information indicating the direction and distance of movement of the image sensor from the original position and the like since the start of drive of the hand-shake correction sensor. In other words, the hand-shake correction sensor 240 acquires position information or vibration information of the image sensor 260 as the hand shake data, and outputs the information to the calculation control unit 220. The position information or vibration information of the image sensor obtained as the hand shake data is used to correct blur of a captured image through the calculation control unit 220 and the hand-shake correction controller 250 to be described later.

The hand-shake correction sensor 240 may output all detected hand shake data to the calculation control unit 220, or may exclude or simplify part of the hand shake data and output the data to the calculation control unit 220. For example, the hand-shake correction sensor 240 may remove vibration in a frequency band as part of detected vibration and output the data to the calculation control unit 220. The hand-shake correction sensor 240 may include, for example, various sensors such as an acceleration sensor and a gyro sensor to acquire the hand shake data. The data may include information acquired by the input detection sensor 210.

(Calculation Control Unit 220)

The calculation control unit 220 calculates, based on the hand shake data acquired by the hand-shake correction sensor 240, a direction in which or a degree (hand-shake correction control amount) by which the hand-shake correction controller 250 controls movement of the image sensor 260. The following describes a hand-shake correction method. The present embodiment describes hand-shake correction performed by the image-sensor shift scheme. First, hand shake is attributable to movement of the position or angle of the image sensor 260 receiving light during exposure. Thus, image blur due to the hand shake can be removed by correcting the position or angle of the image sensor 260 to the original position. The hand-shake correction controller 250 to be described later performs control to correct the image sensor 260 to the original position in this manner, and the calculation control unit 220 calculates a direction in which and a degree by which the hand-shake correction controller 250 moves and tilts the image sensor 260 by controlling, and determines the amount of control the hand-shake correction controller 250.

(Hand-Shake Correction Controller 250)

The hand-shake correction controller 250 performs control to move and tilt the image sensor 260 based on the hand-shake correction control amount calculated by the calculation control unit 220. For example, when the hand-shake correction scheme is the image-sensor shift scheme, the hand-shake correction controller 250 reduces the hand shake by controlling movement of the image sensor 260 so that the image sensor 260 can receive light at the original position. Accordingly, the hand shake can be reduced while high image quality is maintained.

The hand-shake correction scheme is not limited to the above-described image-sensor shift scheme but may use a well-known hand-shake correction method, and the hand-shake correction may be performed by, for example, a lens shift scheme. In the hand-shake correction by the lens shift scheme, the optical axis of light reception by the image sensor is changed by moving a correction lens, and thus the hand-shake correction can be performed by moving the correction lens to cancel difference and movement due to the hand shake.

Alternatively, the hand-shake correction scheme may be an electronic hand-shake correction scheme in which the hand-shake correction is controlled by performing image processing based on the hand shake data. In the hand-shake correction in this case, image blur can be reduced by performing image processing without moving the correction lens or the image sensor 260. In addition to this scheme, the hand-shake correction may be performed through image processing of changing an effective pixel region by determining shift of an object through sequential image data by using a plurality of pieces of image capturing data.

(Image Sensor 260)

The image sensor 260 performs exposure, receives light from an object, photoelectrically converts the received light into an image, and stores the converted image. The image sensor 260 completes image capturing by receiving light the object in an exposure duration from the start of the exposure to the end of the exposure. The image sensor 260 may be movable under control of the hand-shake correction controller 250. In such a case, the hand-shake correction controller 250 can reduce hand shake by controlling movement of the image sensor 260 cancel shift and movement due to the hand shake, thereby clearly capturing an image.

(Shutter 270 and Mirror 280)

A shutter 270 or a mirror 280 may be provided to the image capturing device 200. The shutter 270 blocks the image sensor 260 so that the image sensor 260 is not exposed at a time other than image capturing, and the mirror 280 reflects an image of the object incident on the image capturing device 200 and guides the image to a finder so that the image capturing person accurately recognizes the object through the finder. The shutter 270 or the mirror 280 generates vibration through drive and thus can be used as an alternative of the vibration generation device 100 to be described later.

The following describes the vibration generation device 100 that starts drive as the image capturing device 200 as described above detects inputting of the image capturing operation.

(Input-Output Unit 130)

The input-output unit 130 has a function to input and output information to and from the image capturing device 200. Specifically, the input-output unit 130 according to the present embodiment acquires, through the input-output unit 230 of the image capturing device 200, the input detection signal output from the input detection sensor 210 having detected inputting of the image capturing operation. Similarly to the input-output unit 230, the input-output unit 130 may perform acquisition and outputting of information through communication, for example, in a wired or wireless manner.

For example, the input-output unit 130 may be a port, such as a universal serial bus (USB) port, an IEEE1394 port, a small computer system interface (SCSI), an RS-232C port, or an optical audio terminal, through which an external connection instrument is connected.

(Vibration Control Unit 120)

The vibration control unit 120 controls, based on the input detection signal acquired by the input-output unit 130, a vibration frequency at which and the start and end timings of a vibration duration in which the vibration unit 110 is caused to generate vibration. The end timing of the vibration duration does not need to be controlled, but the vibration may be ended after a certain duration since the start of the vibration duration or the image capturing operation. The vibration frequency and the vibration generation timing will be described in detail later.

The vibration control unit 120 causes the vibration unit 110 to generate vibration in a second frequency band different from a first frequency band that the image capturing device 200 has as a vibration range used for hand-shake correction control. Accordingly, it is possible to feed back vibration to the image capturing person without affecting hand-shake correction control. When the vibration range used for hand-shake correction control has a predetermined frequency band, the vibration control unit 120 may cause the vibration unit 110 to generate vibration in a frequency band different from the frequency band. When the frequency band of the vibration range used for hand-shake correction control varies, the vibration control unit 120 determine a frequency band different from the frequency band of the vibration range used for hand-shake correction control in accordance with the variation, and cause the vibration unit 110 to generate vibration.

The vibration control unit 120 may execute the above-described control, for example, through cooperation between software and hardware. For example, the vibration control unit 120 may include, as the hardware, a central processing unit (CPU), a read only memory (ROM), and a random access memory (RAM).

For example, the CPU functions as an arithmetic processing device or a control device, and controls the entire operation of each component based on various computer programs recorded in the ROM and the RAM or part thereof. The range of the technology of the present disclosure includes a computer program configured to cause a computer including a CPU and the like to execute the above-described function, and a storage medium storing the computer program.

The ROM stores each computer program read by the CPU, data used for calculation, and the like. The RAM temporarily or permanently stores, for example, each computer program read by the CPU and various parameters and the like that change as appropriate when the computer program is executed.

(Vibration Unit 110)

The vibration unit 110 has a function to generate vibration under control of the vibration control unit 120. The vibration unit 110 may include, for example, a piezoelectric element, a decentering motor, and a voice coil motor to generate vibration. The vibration unit 110 only needs to be able to vibrate at least in a frequency band different from the frequency band of the vibration range used for hand-shake correction control and is not limited to the above-described configuration but may include a well-known vibration device.

Figure 2:
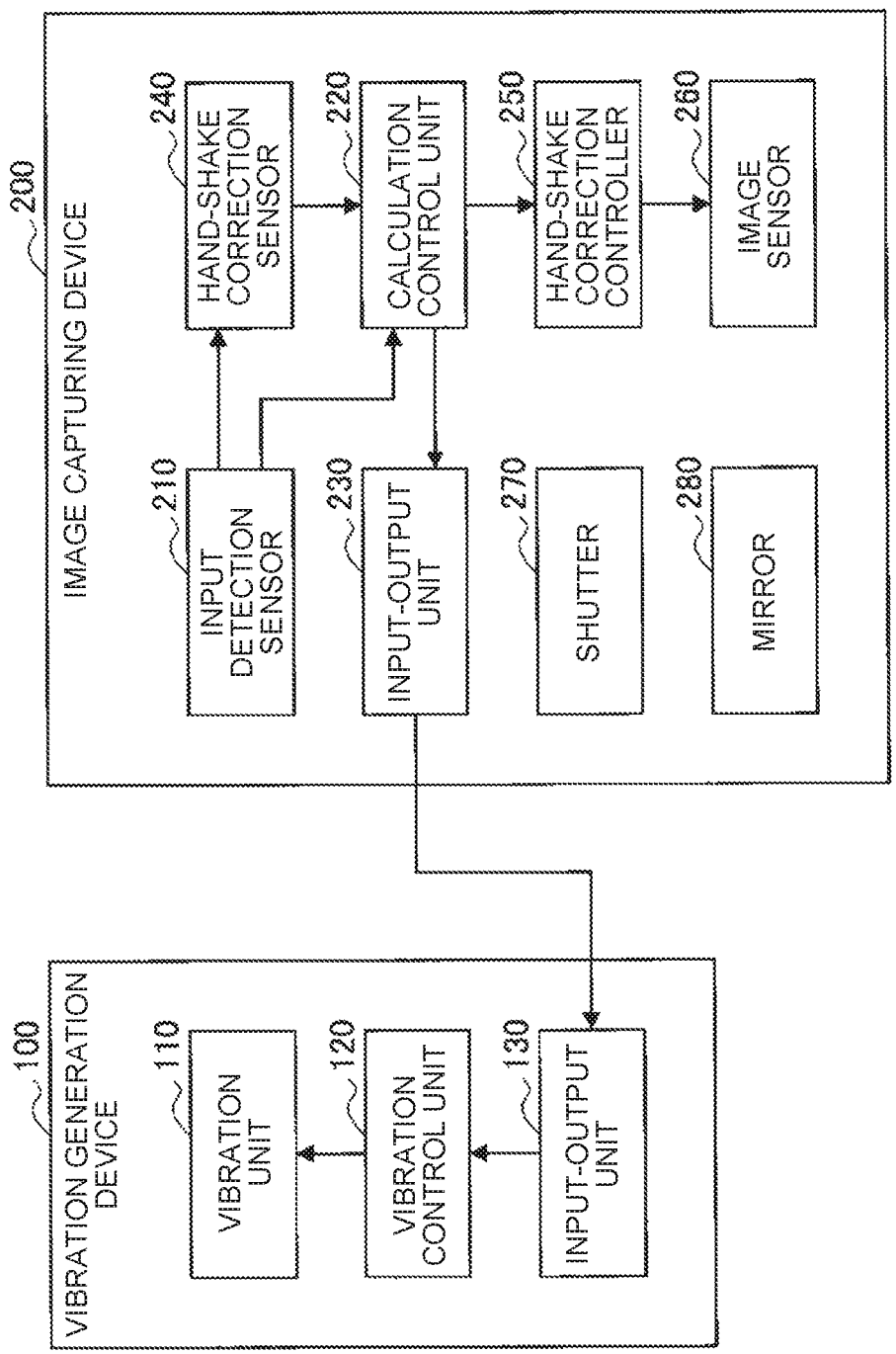
FIG. 2 is a diagram illustrating the function and configuration of the vibration generation device according to a modification of the embodiment.

The following describes a modification of the above-described embodiment of the present disclosure with reference to FIG. 2. The modification described below may be applied in place of the configuration described in the above-described embodiment.

In the example illustrated in FIG. 1, the input detection signal upon detection of inputting of the image capturing operation is directly output from the input detection sensor 210 of the image capturing device 200 to the vibration generation device 100 through the input-output units 230 and 130. However, in the example illustrated in FIG. 2, the input detection signal is output from the input detection sensor 210 of the image capturing device 200 to the calculation control unit 220, and thereafter a vibration control signal provided with arithmetic processing at the calculation control unit 220 is output to the vibration generation device 100 through the input-output units 230 and 130.

In the present modification, processing performed by the vibration control unit 120 described above with reference to FIG. 1 is performed by the calculation control unit 220 instead. In FIG. 2, when having received the vibration control signal provided with arithmetic processing at the calculation control unit 220, the vibration generation device 100 causes the vibration unit 110 to generate vibration. According to the present modification, vibration control determination is performed at the image capturing device 200, which reduces a load of information processing at the vibration generation device 100. Thus, in the modification illustrated in FIG. 2, the capacity of the arithmetic processing device, a circuit configuration, and the like can be simplified as compared to those in the example illustrated in FIG. 1, which leads to further reduction of the weight or size of the vibration generation device 100.

The shutter 270 or the mirror 280 may be used as a vibration generation device in place of the vibration generation device 100 according to the present embodiment. Specifically, the shutter 270 or the mirror 28 may be used to generate vibration in a frequency band different from the frequency band of the vibration range used for hand-shake correction control. Accordingly, the image capturing device 200 using the shutter 270 or the mirror 280 as a vibration generation device has a configuration similar to that of what is called a single-lens reflex camera, and thus can feed back, to the image capturing person, vibration closer to an image capturing feeling with a single-lens reflex camera.

1.2. Specific Example of Vibration Control

Figure 3:
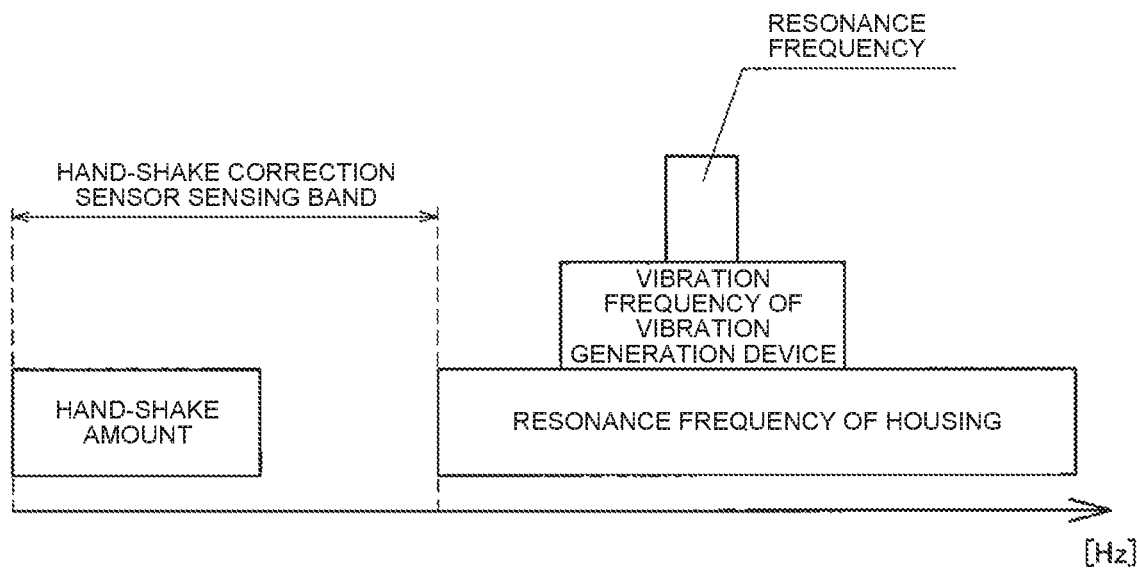
FIG. 3 is a diagram for description of the concept of a frequency at which the vibration generation device according to the embodiment vibrates.

The following describes a specific example of vibration control by the vibration generation device 100 according to the present embodiment, in particular, the vibration frequency and the vibration generation timing with reference to FIG. 3.

(Vibration Frequency)

The frequency of vibration generated by the vibration unit 110 of the vibration generation device 100 may be the second vibration frequency different from the first vibration frequency range that the image capturing device 200 has and is used for hand-shake correction control. The vibration generation device 100 can generate vibration without affecting hand-shake correction control by causing the vibration unit to generate vibration in the second frequency band different from the first frequency band that the image capturing device 200 has as a vibration range used for hand-shake correction control, and thus can feed back vibration to the image capturing person while avoiding influence on hand-shake correction control.

FIG. 3 is a diagram for description of the concept of a frequency at which the vibration generation device 100 vibrates. In FIG. 3, the horizontal axis represents the vibration frequency, and the arrow direction indicates the high frequency side. FIG. 3 illustrates the relation between the frequency and each of the frequency range (in FIG. 3, a range denoted by "hand-shake amount") of vibration caused by hand shake, a sensing band of the hand-shake correction sensor 240, a vibration frequency (in FIG. 3, a range denote by "resonance frequency of housing") at which a housing of the image capturing device 200 can resonate, a vibration frequency (in FIG. 3, a range denote by "vibration frequency of vibration generation device") at which the vibration unit 110 of the vibration generation device 100 can generate vibration, a vibration frequency (in FIG. 3, a range denote by "resonance frequency") selectively used by the vibration control unit 120 to cause the vibration unit 110 to vibrate.

FIG. 3 illustrates a case in which a frequency sensing band that can be sensed by the hand-shake correction sensor 240 is different from the resonance frequencies of the vibration generation device 100 and the image capturing device 200.

As illustrated in FIG. 3, the frequency at which the vibration generation device 100 vibrates preferably includes a resonance frequency different from the sensing band that can be sensed by the hand-shake correction sensor 240. Accordingly, the frequency at which the vibration generation device 100 vibrates is not sensed by the hand-shake correction sensor 240, and thus influence on hand-shake correction control can be reduced. In FIG. 3, the sensing band of the hand-shake correction sensor corresponds to the first frequency band, and a frequency band different from the first frequency band corresponds to the second frequency band.

Figure 4:
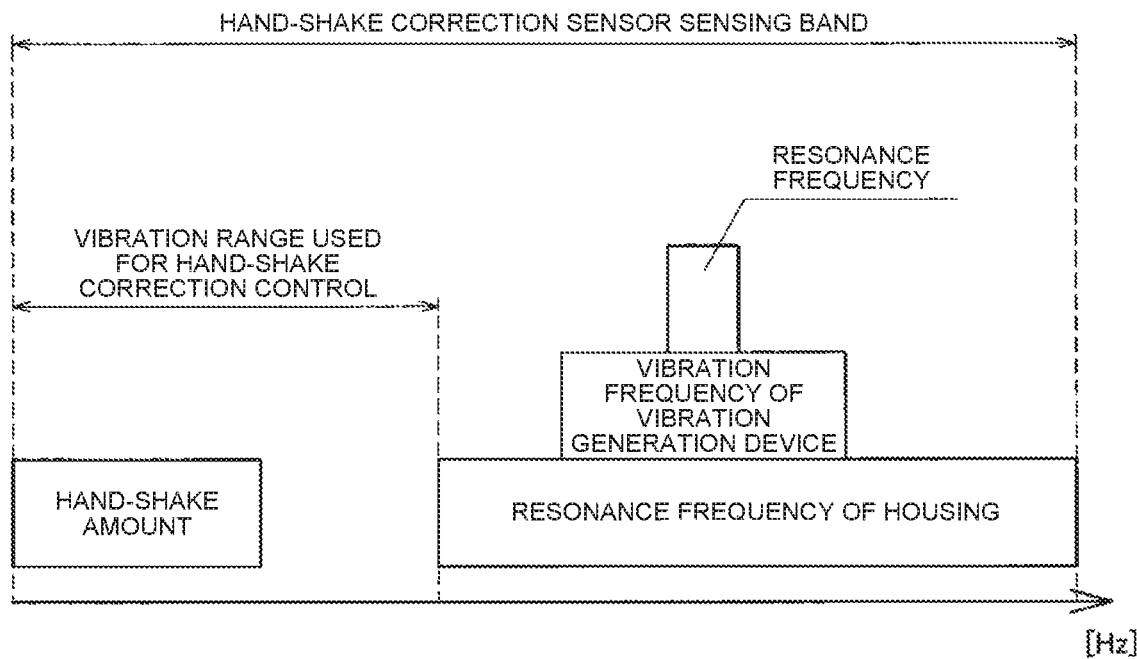
FIG. 4 is a diagram for description of the concept of the frequency at which the vibration generation device according to the embodiment vibrates.

Similarly to FIG. 3, FIG. 4 is a diagram for description of the concept of the frequency at which the vibration generation device 100 vibrates. FIG. 3 illustrates a case in which the resonance frequencies of the vibration generation device 100 and the image capturing device 200 are different from the sensing range of the hand-shake correction sensor 240. However, FIG. 4 illustrates a case in which the resonance frequencies of the vibration generation device 100 and the image capturing device 200 are included in the sensing range of the hand-shake correction sensor 240. In the example illustrated in FIG. 4, the calculation control unit 220 performs signal processing on a vibration signal sensed by the hand-shake correction sensor 240 to generate a vibration signal to be used by the hand-shake correction controller 250, and outputs the generated vibration signal to the hand-shake correction controller 250, which starts hand-shake correction control.

The resonance frequencies of the vibration generation device 100 and the image capturing device 200 may be in the second vibration frequency band different from the first vibration frequency band used by the hand-shake correction controller 250. In this case, vibration generated by the vibration generation device 100 is sensed by the hand-shake correction sensor 240 but removed by the calculation control unit 220 before input to the hand-shake correction controller 250. Thus, in FIG. 4, the vibration range used for hand-shake correction control corresponds to the first frequency band, and a frequency band different the first frequency band corresponds to the second frequency band. Accordingly, the vibration generation device 100 can generate vibration without affecting hand-shake correction control.

For example, the calculation control unit 220 may use a low-pass filter, a band stop filter, or integration calculation to perform signal processing on the vibration signal sensed by the hand-shake correction sensor 240. The calculation control unit 220 may generate the vibration signal to be used by the hand-shake correction controller 250 by removing, in particular, a high frequency component from the vibration signal sensed by the hand-shake correction sensor 240 by using any of the above-described filters and the like.

In addition, the calculation control unit 220 may determine the frequency band of vibration used by the hand-shake correction controller 250 based on the vibration signal sensed by the hand-shake correction sensor 240.

For example, the calculation control unit 220 may determine, as the frequency band of vibration used by the hand-shake correction controller 250, the frequency band of the vibration signal actually sensed by the hand-shake correction sensor 240. In such a case, the calculation control unit 220 may optionally change the frequency band of vibration generated by the vibration unit 110 in accordance with the frequency band of vibration used by the hand-shake correction controller 250. With this configuration, the vibration generation device 100 can vibrate the vibration unit 110 at an appropriate frequency band in accordance with a situation.

As described above, the vibration frequency of the vibration generation device 100 in the present embodiment is different from the frequency band of vibration used at the hand-shake correction controller 250. The frequency band of vibration of the vibration generation device 100, which is the second frequency band, may be, for example, 20 Hz to 800 Hz. Vibration at a frequency in this range can be relatively easily generated by a well-known vibration device, and thus can be generated without an overload on the vibration unit 110 generating the vibration. Accordingly, the vibration generation device 100 can feed back execution of image capturing to the image capturing person by transferring the vibration thereto.

The second frequency band of the vibration generation device 100 may be 150 Hz to 800 Hz. This frequency range is different from a range in which the hand-shake correction sensor 240 typically senses hand shake, and can be filtered by an electric circuit or calculation, and thus the vibration generation device 100 can feed back execution of image capturing to the image capturing person without causing malfunction to the hand-shake correction controller 250.

In addition, the second frequency band of the vibration generation device 100 may be 200 Hz to 400 Hz. Vibration at a frequency in this range is in a frequency band in which the vibration can be easily felt by a human finger, and thus the vibration generation device 100 can facilitate recognition of feedback through generated vibration by the person.

The following describes a first specific example of the above-described vibration frequency. For example, the hand-shake correction sensor 240 is a gyro sensor configured to sense a vibration frequency up to 100 Hz, and the sensor 240 is attached to the image capturing device 200 having a resonance frequency around 300 Hz. In this case, the housing of the image capturing device 200 has a resonance frequency of 100 Hz or higher. The calculation control unit 220 performs calculation based on information obtained by the gyro sensor, and hand-shake correction control is performed based on a result of the calculation.

In this manner, when the vibration generation device 100 and the image capturing device 200 are integrated, vibration feedback can be provided to the image capturing person at a frequency near 250 Hz, at which vibration can be easily felt by a human finger. However, the hand-shake correction controller 250 provided to the image capturing device 200 does not operate in response to vibration in a frequency range outside the frequency range of vibration sensed by the gyro sensor.

Thus, vibration generated by the vibration generation device 100 does not affect hand-shake correction control. However, the hand-shake correction controller 250 starts control for vibration at a frequency of 20 Hz or lower, which is a typical hand shake frequency, and thus the hand-shake correction can be performed.

The following describes a second specific example. For example, the hand-shake correction sensor 240 includes a gyro sensor configured to sense the vibration frequency of 100 Hz or higher, such as 1 kHz, and the vibration generation device 100 having a resonance frequency around 300 Hz is attached to the image capturing device 200. In this case, the housing of the image capturing device 200 has a resonance frequency of 100 Hz or higher. The calculation control unit 220 applies a low-pass filter or a band-pass filter to a signal input from the gyro sensor, thereby cutting off an optional frequency of, for example, 100 Hz or higher through signal processing.

Accordingly, the calculation control unit 220 can start control of the hand-shake correction controller 250 to correct only hand shake having a frequency lower than 100 Hz. The calculation control unit 220 can start control of the hand-shake correction controller 250 by using only a vibration signal in a frequency band lower than 100 Hz by calculating the time integral of a value obtained by converting vibration into an analog signal of voltage through software for a constant period. In this manner, the vibration generation device 100 performs signal processing on a vibration signal acquired by the hand-shake correction sensor 240, thereby generating vibration without affecting hand-shake correction control.

(Vibration Generation Timing)

Figure 5:
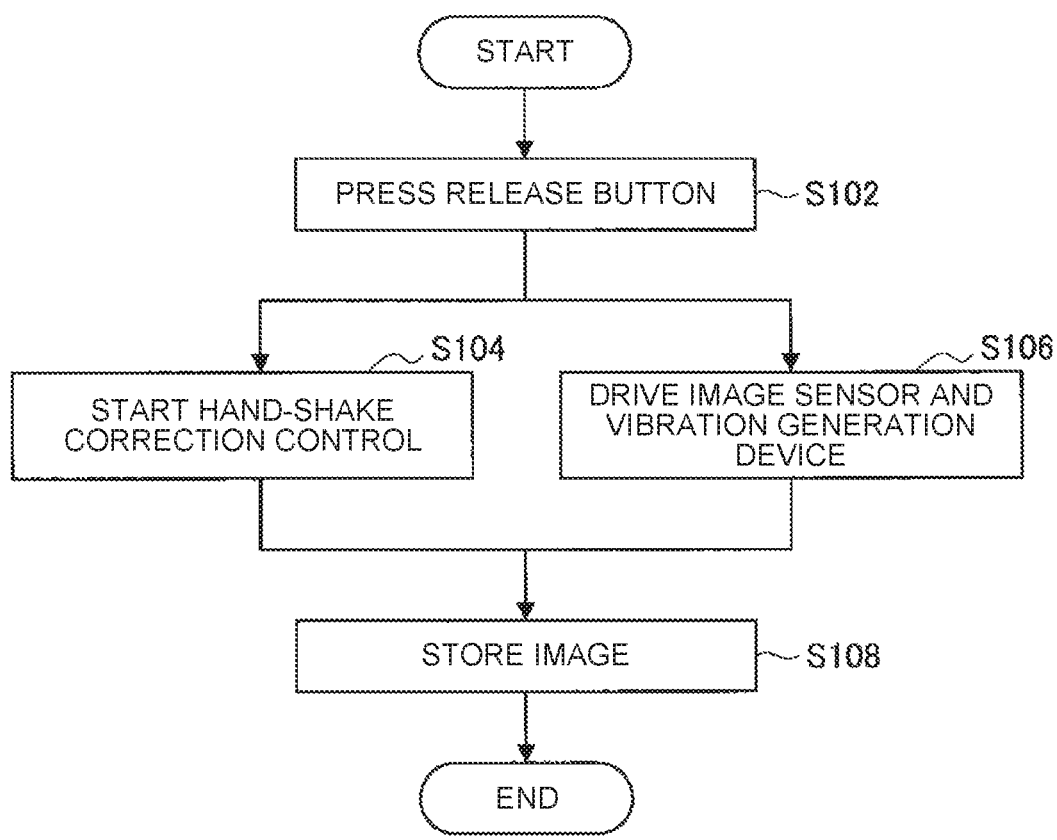
FIG. 5 is a flowchart illustrating the process of operation through which an image capturing device 200 according to the present embodiment performs image capturing operation, the vibration generation device performs vibration, and an image is stored.

The following describes an operation process involving the image capturing operation performed by the image capturing device 200 with reference to the timing at which the vibration generation device 100 according to the present embodiment vibrates. FIG. 5 is a flowchart illustrating an operation process through which the image capturing operation at the image capturing device 200 according to the present embodiment, the vibration generation device 100 vibrates, and then the image capturing device 200 stores an image.

As illustrated FIG. 5, first, the image capturing person presses down the release button or the like provided to the image capturing device 200, and accordingly, the input detection sensor 210 provided to the image capturing device 200 detects inputting of image capturing operation performed by the image capturing person (S102).

Subsequently after the input detection sensor 210 has detected the inputting, the hand-shake correction controller 250 starts control. Although not illustrated, the hand-shake correction sensor 240 starts acquisition of the hand shake data as the position information or vibration information of the image sensor 260 in parallel after the input detection sensor 210 has detected the inputting. Based on the hand shake data acquired by the hand-shake correction sensor 240, the calculation control unit 220 outputs a signal for movement control of the image sensor 260 to the hand-shake correction controller 250. Through this process, the hand-shake correction controller 250 performs hand-shake correction control in accordance with the moving direction or degree of the image sensor 260 output based on the hand shake data (S104).

Subsequently as the hand-shake correction controller 250 starts the control, the image sensor 260 moves in a direction to cancel vibration due to hand shake so that the position of the image sensor 260 relative to a light beam is set in an allowable range. Simultaneously or after the start of the hand-shake correction control, the image sensor 260 starts exposure. The vibration generation device 100 is driven in accordance with the control start by the hand-shake correction controller 250 or the exposure of the image sensor 260 (S106).

Subsequently, when sufficient light incidence on the image sensor 260 is completed through the exposure, the image sensor 260 ends the exposure. After having ended the exposure, the image sensor 160 stores a captured image. The hand-shake correction controller 250 and the vibration generation device 100 end the control and the vibration in accordance with the exposure end (S108).

Through the above-described operation process, the vibration generation device 100 vibrates in accordance with the image capturing operation performed by the image capturing device 200.

Figure 6:
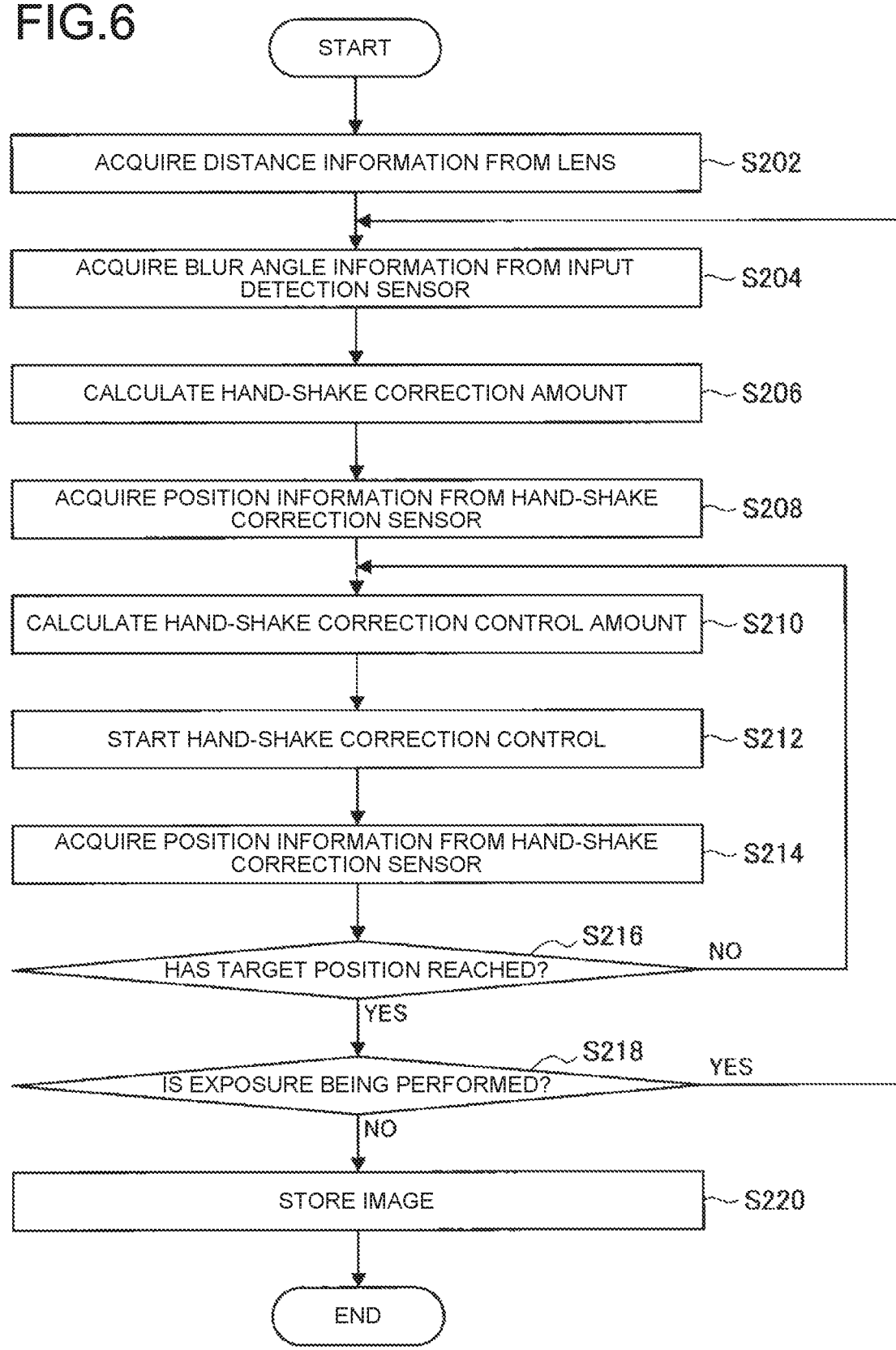
FIG. 6 is a flowchart illustrating the process of operation through which the image capturing device according to the embodiment performs image capturing operation, an image is stored, and image capturing is ended.

The following describes in detail the flowchart of FIG. 5, in particular, a process from the start of the control by the hand-shake correction controller 250 to the end of the exposure by the image sensor 260 with reference to FIG. 6. FIG. 6 is a flowchart illustrating an operation process at the image capturing device 200 according to the present embodiment, from the image capturing operation to the end of image capturing through image storage.

First, information of the distance between an object and the image capturing device 200 is acquired a lens (not illustrated) provided to the image capturing device 200 (S202).

Subsequently, the input detection sensor 210 acquires blur angle information of the image sensor 260 based on the information of the distance between the object and the image capturing device 200 (S204).

Subsequently, the calculation control unit 220 calculates a target position of the image sensor 260 based on hand shake data including the blur angle information (S206).

Subsequently, the hand-shake correction sensor 240 acquires the position information of the image sensor 260 (S208).

Subsequently, the calculation control unit 220 calculates, based on the position information and blur angle information of the image sensor 260, a hand-shake correction control amount by which the hand-shake correction controller 250 controls the image sensor 260 (S210).

Subsequently, the hand-shake correction controller 250 starts control in accordance with the hand-shake correction control amount output from the calculation control unit 220 (S212).

Subsequently, the hand-shake correction sensor 240 acquires the position information of the image sensor 260 again (S214).

Subsequently, the calculation control unit 220 determines whether the image sensor 260 has reached the target position based on the position information of the image sensor 260. When the image sensor 260 has reached the target position, the process proceeds to the next step. When the image sensor 260 has not reached the target position, the process returns to S210 to repeat the control at S210 to S214 until the target position is reached (S216).

Subsequently, when the image sensor 260 has reached the target position, it is determined whether exposure is being performed. When exposure is being performed, the process returns to S204 to acquire the blur angle information and repeat the control at S210 to S214 until the target position is reached again. When the exposure is ended, the process proceeds to the next step (S218).

Subsequently after having ended the exposure, the image sensor 260 stores an image (S220).

Although the operation process from the image capturing operation to the end of image capturing through image storage is described above with reference to FIG. 6, the series of steps are merely exemplary and not restrictive. For example, the scheme of the hand-shake correction control may be the lens shift scheme or the electronic hand-shake correction scheme instead of the image-sensor shift scheme described with reference to the flowchart of FIG. 6.

The vibration generation device 100 may vibrate at any timing after the image capturing operation. The following exemplarily describes the operation of each component in more detail with reference to exemplary timings at which the vibration generation device 100 according to the present embodiment vibrates.

Figure 7:
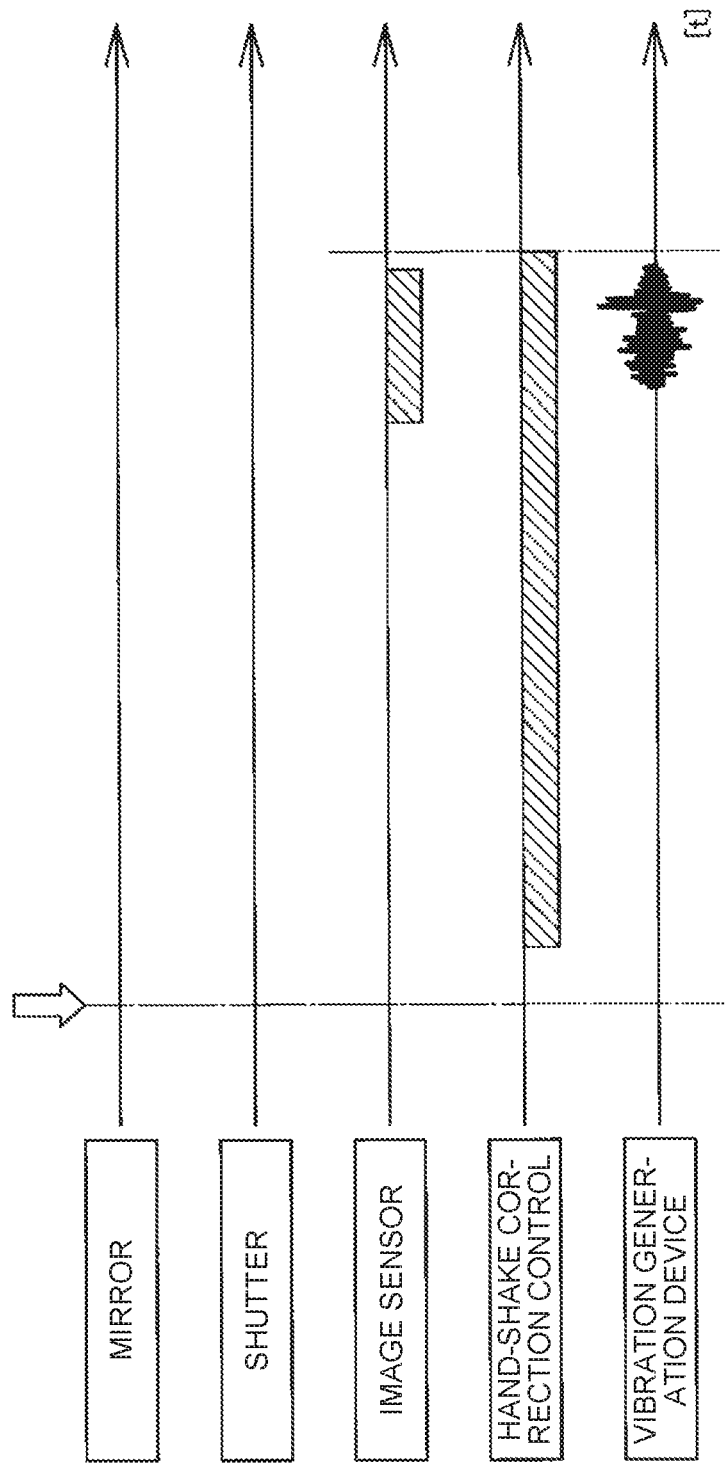
FIG. 7 is a conceptual diagram for description of an exemplary timing at which a vibration generation device 100 according to the embodiment vibrates.

For example, FIG. 7 is a conceptual diagram for description of an example of the timing at which the vibration generation device 100 vibrates. In the illustrated example, the image capturing device 200 is not provided with a mirror or a shutter. The white arrow indicates the timing at which the image capturing device 200 detects inputting of the image capturing operation. In other words, the process from detection of inputting of the image capturing operation to image storage, which is described with reference to FIGS. 5 and 6, is performed at the timing indicated by the arrow.

As illustrated in FIG. 7, the hand-shake correction controller 250 is driven first after the input detection of the image capturing operation. Image capturing is performed as the image sensor 260 is exposed while the hand-shake correction controller 250 is driven. With this configuration, image capturing can be performed while hand shake during the exposure is reduced by the hand-shake correction controller 250.

In this case, the vibration control unit 120 of the vibration generation device 100 controls, in accordance with the exposure duration from the start to end of the exposure of the image sensor 260, the start and end timings of the vibration duration in which the vibration unit 110 is caused to generate vibration. The vibration duration in which the vibration unit 110 is caused to generate vibration may at least partially overlap with the exposure duration. The end timing of the vibration duration may not be controlled, and the vibration as be ended after a certain duration since the start of the vibration duration or the image capturing operation.

In FIG. 7, the exposure duration and the vibration duration substantially coincide with each other, and the vibration unit 110 continuously vibrates in the exposure duration. Accordingly, the vibration is continuously fed back to the image capturing person in the exposure duration, and thus the vibration generation device 100 can present an accurate image capturing timing to the image capturing person.

Figure 8:
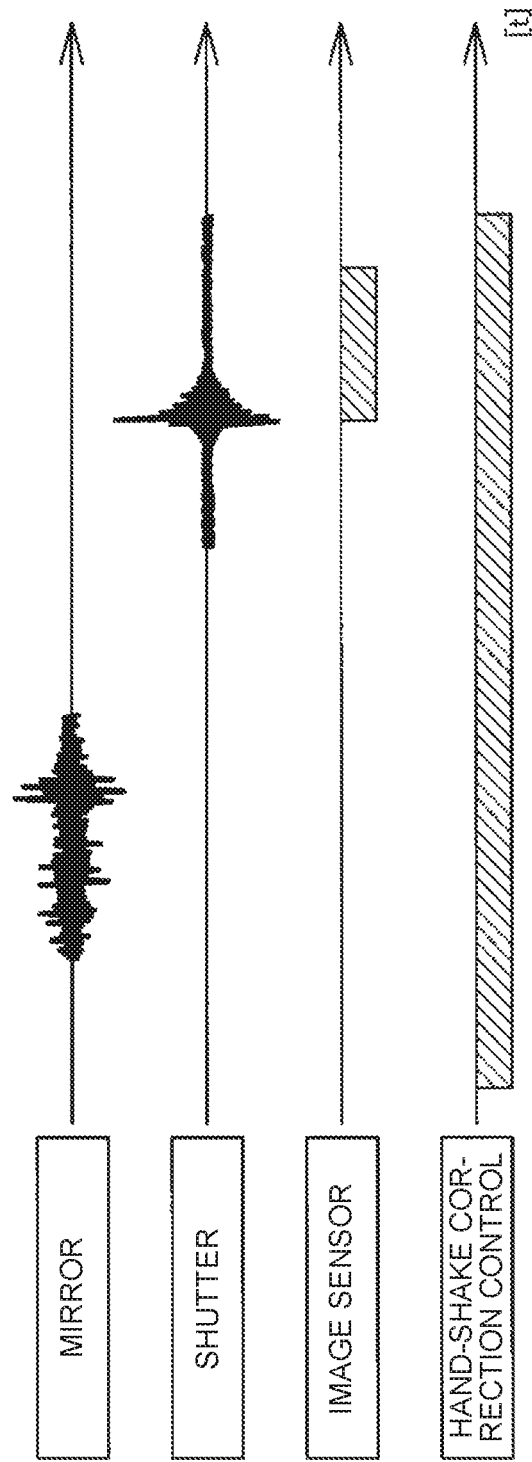
FIG. 8 is a conceptual diagram for description of an exemplary timing of operation performed by each component of an image capturing device to which the vibration generation device is not applied.

Refer to FIG. 8 as Comparative Example 1. FIG. 8 is a conceptual diagram for description of an exemplary timing of operation performed by each component of an image capturing device to which the vibration generation device is not applied. FIG. 8 illustrates the process of operation of the image capturing device provided with a mirror and a shutter. With the image capturing device, an image capturing person can recognize an image capturing timing through vibration caused by the mirror and the shutter. However, the mirror and the shutter generates sound along with the vibration, and thus, with the image capturing device, the image capturing person cannot freely select an image capturing environment due to, for example, hesitation toward image capturing in a quiet environment.

In addition, the shutter largely vibrates at the exposure start, and thus the hand-shake correction control does not normally operate and blur occurs to a captured image in some cases. However, for example, when the vibration generation device 100 according to the present embodiment is applied in place of the mirror or the shutter, the vibration unit 110 can generate vibration without affecting hand-shake correction control, and thus the image capturing person can recognize image capturing.

Figure 9:
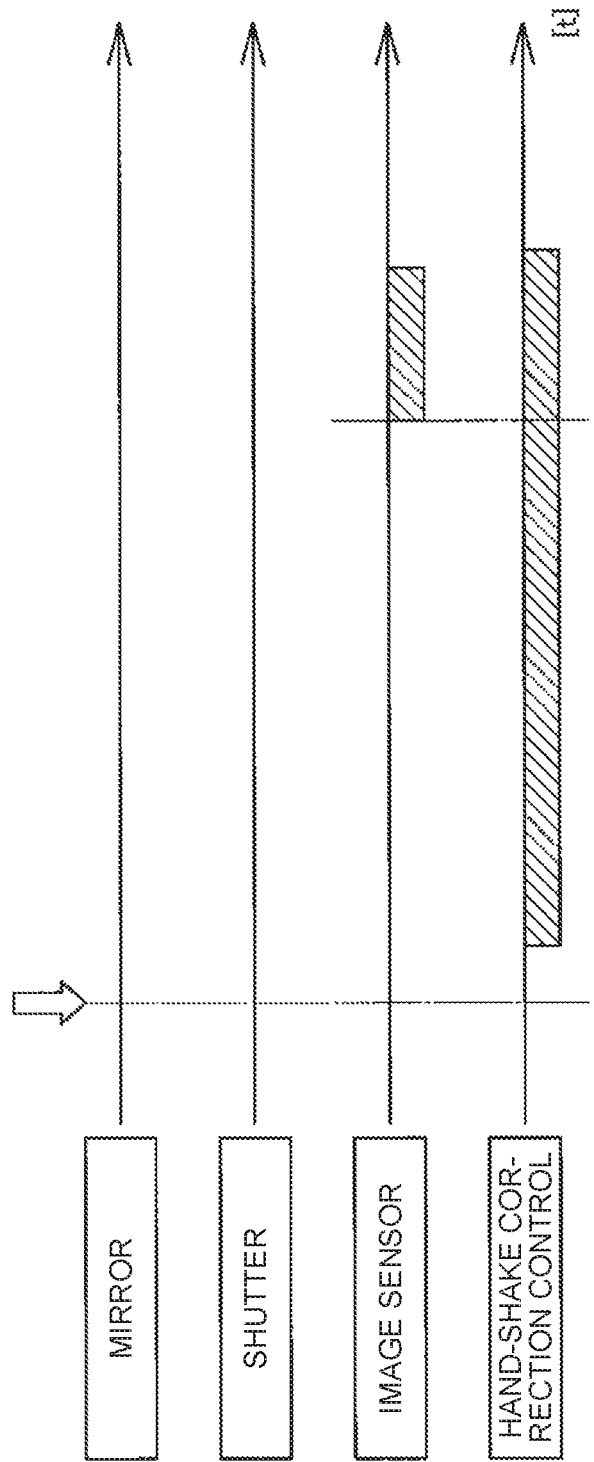
FIG. 9 is an explanatory diagram for description of an exemplary timing of operation performed by each component of the image capturing device for which a mirror and a shutter that generate vibration and sound are removed.

Refer to FIG. 9 as Comparative Example 2. FIG. 9 is an explanatory diagram for description of an exemplary timing of operation performed by each component of an image capturing device including no mirror nor shutter. Methods of knowing an image capturing timing with such an image capturing device include a method of visually feeding back the image capturing timing to an image capturing person by using an information display device such as a display.

However, the image capturing person performs image capturing without seeing the display or the like in some cases depending on an image capturing environment, and thus the image capturing person sometimes needs to perform image capturing without recognizing an accurate image capturing timing. When the vibration generation device 100 according to the present embodiment is applied to such an image capturing device, the vibration unit 110 can generate haptic feedback through vibration without visual feedback, and thus the image capturing timing can be fed back to the image capturing person.

The vibration duration in which the vibration generation device 100 is caused to generate vibration may include the exposure duration. Specifically, the vibration generation device 100 may start vibration before the exposure start and may end the vibration after the exposure end. Accordingly, the image capturing person can reliably know the exposure duration of the image sensor 260 irrespective of the length of the exposure time. In addition, the vibration duration longer than the exposure duration can prevent the image capturing person from wrongly causing new vibration generation in the exposure duration.

Alternatively, the vibration generation device 100 may start vibration before the exposure start and may end the vibration in the exposure duration. When starting the vibration before the exposure start in this manner, the vibration generation device 100 can cause the image capturing person to predict the exposure start in advance, and thus can make the image capturing person aware of hand shake reduction.

Alternatively, the vibration duration in which the vibration generation device 100 is caused to generate vibration may be included in the exposure duration. Specifically, the vibration generation device 100 may start vibration after the exposure start and may end the vibration before the exposure end. With this configuration, the vibration generation device 100 vibrates in the exposure duration, thereby causing the image capturing person to accurately recognition that the exposure is performed.

Alternatively, the vibration duration may be intermittent. In such a case, the vibration generation device 100 can reduce a load on the vibration unit 110 that generates vibration.

1.3. First Exemplary Application

Figure 10:
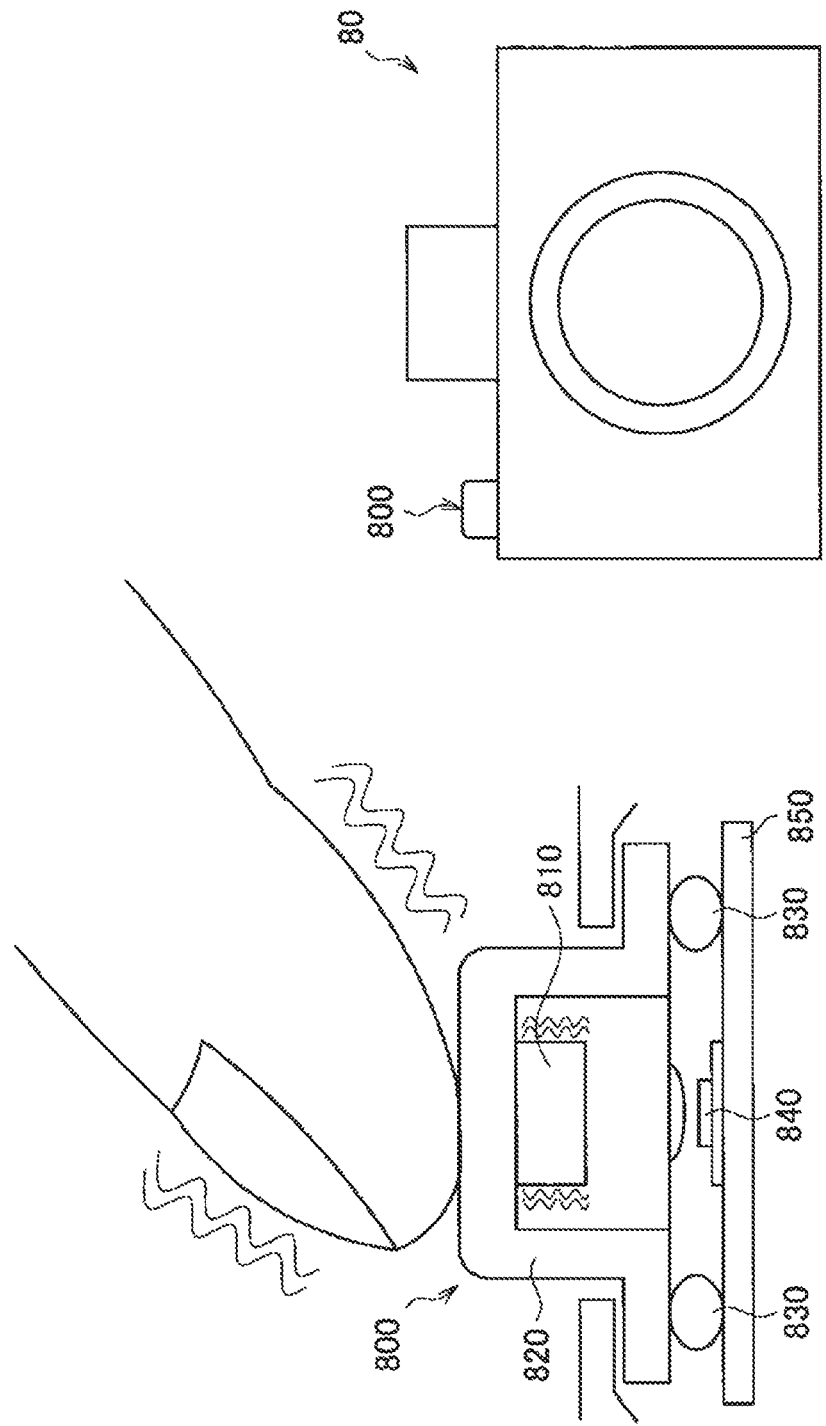
FIG. 10 is a diagram illustrating the appearance and outline of a camera to which the vibration generation device according to the embodiment is applied.
Figure 11:
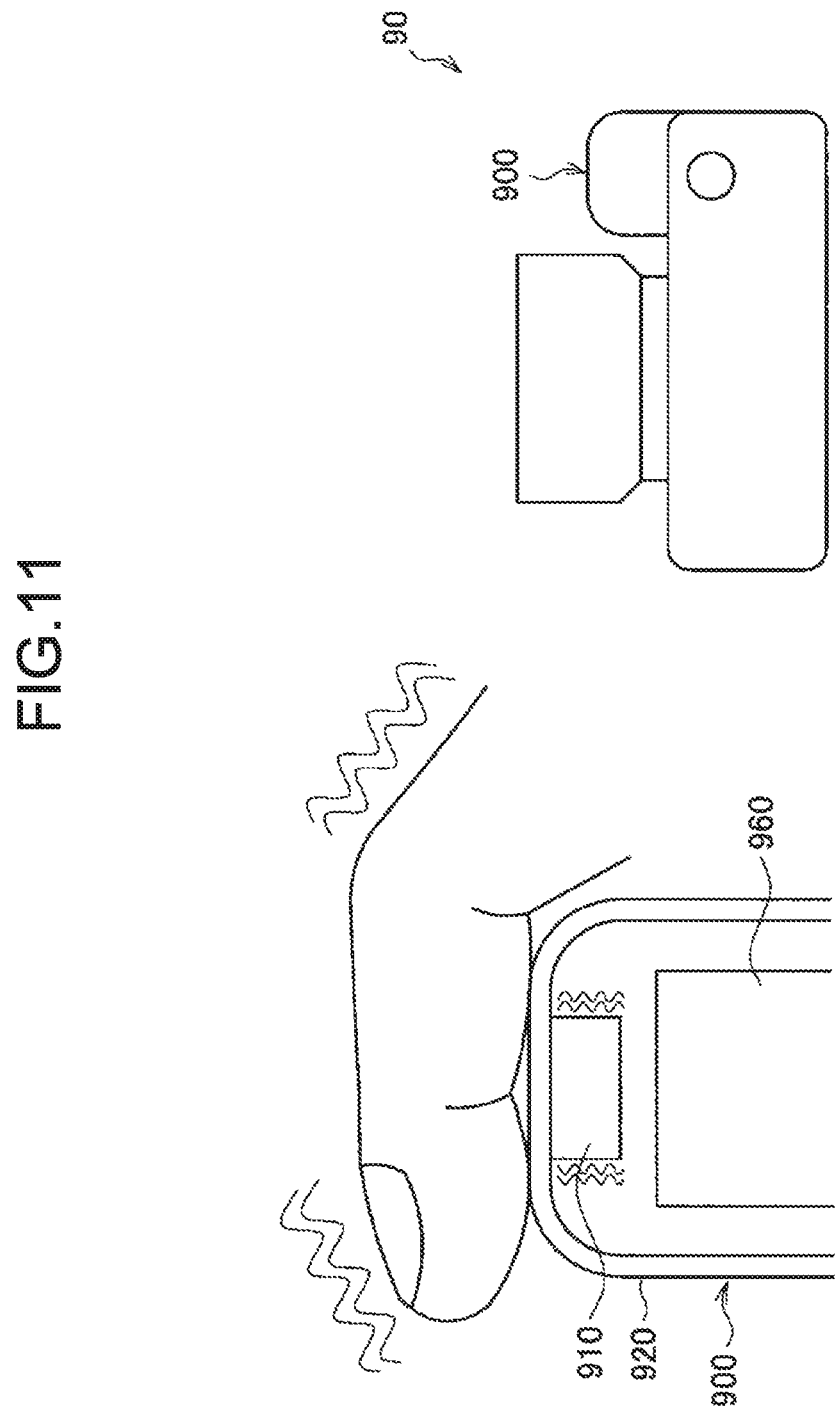
FIG. 11 is a diagram illustrating the appearance and outline of another camera to which the vibration generation device according to the embodiment is applied.

The following describes an exemplary application of a vibration generation device according to the present embodiment. The technology of the present embodiment can feed back vibration without affecting hand-shake correction control, and thus is applicable to a camera as an image capturing device. The attachment place of the vibration generation device is not particularly limited but may be any place where an image capturing person can receive feedback. Such an exemplary application will be described below with reference to FIGS. 10 and 11. FIGS. 10 and 11 illustrate an example in which the vibration generation device is provided inside a housing of the image capturing device.

This vibration generation device 810 according to the present embodiment is applicable to, for example, the shutter button of a camera 80 as illustrated in FIG. 10. FIG. 10 is a diagram illustrating the appearance and outline of the camera 80 to which the vibration generation device according to the present embodiment is applied.

In FIG. 10, as a finger of the image capturing person presses a shutter button 820, a switch 840 below the shutter button 820 is pressed, and inputting of image capturing operation to the camera 80 is sensed. Thereafter, the vibration generation device 810 vibrates, and the vibration is fed back to the image capturing person at image capturing. As illustrated in FIG. 10, a place 800 where the vibration generation device 100 is applied to the camera 80 includes the vibration generation device 810 to which the vibration generation device according to the present embodiment is applied, the shutter button 820, a vibration absorber 830, the switch 840, and a housing 850.

The vibration generation device 810 is provided to the shutter button 820. The vibration generation device 810 may be provided at any place where the vibration generation device 810 can vibrate the shutter button 820. With this configuration, the vibration generation device 810 can generate vibration in accordance with the image capturing operation, and the vibration can be fed back to the finger of the image capturing person through the shutter button 820.

For example, the shutter button 820 includes the vibration generation device 810 and has a convex shape. The shutter button 820 is not limited to a convex shape but may have any configuration with which an input operation of the image capturing operation performed by the finger of the image capturing person can be transferred to the switch 840 through the shutter button 820.

The vibration absorber 830 is provided at a position between the housing 850 of the camera 80 and the shutter button 820. With this configuration, the shutter button 820 can transfer pressing operation to the switch 840 and also can prevent vibration generation by the vibration generation device 810 from being transferred to the housing of the camera 80 through the shutter button 820.

The vibration absorber 830 may be various well-known and typically used vibration absorbers, and may be, for example, a well-known elasticity agent or viscosity agent. With this configuration, the vibration absorber 830 can prevent vibration generated by the vibration generation device 810 from being transferred to the housing 850, thereby preventing resonance of the housing 850.

The switch 840 is provided to the housing of the camera 80 to acquire pressing operation of the shutter button 820 so that the camera 80 senses inputting of the image capturing operation. Similarly to the shutter button, the switch 840 may be provided at any position where the image capturing person can input the image capturing operation.

The housing 850 is part of the housing of the camera 80 and is a place where the switch 840 or the vibration absorber 830 is provided.

As described above, when the vibration generation device 810 is provided to the shutter button 820 of the camera 80, the vibration generation device 810 can efficiently provide haptic feedback to the image capturing person.

The following describes another exemplary application of the vibration generation device according to the present embodiment when the vibration generation device is provided at a place different from that in FIG. 10.

For example, the vibration generation device according to the present embodiment is applicable to a grip of a camera as illustrated in FIG. 11. FIG. 11 is a diagram illustrating the appearance and outline of the camera to which the vibration generation device according to the present embodiment is applied.

FIG. 11 illustrates a situation in which an image capturing person holds a grip 900 of a camera 90. As illustrated in FIG. 11, the grip 900 of the camera 90 to which the vibration generation device is applied includes a vibration generation device 910 to which the vibration generation device according to the present embodiment is applied, a battery 960, and a housing 920 of the camera 90.

The grip 900 is part of the housing of the camera 90 and has a size and a shape appropriate for holding of the camera 90 by the image capturing person. For example, the grip 900 may have a size and a shape appropriate for grasping by a palm of the image capturing person. Various components of the camera 90 may be enclosed inside the grip 900.

The battery 960 is a battery that stores electrical power used at drive of the camera 90, and specifically, may be a secondary battery that can be repeatedly electrically charged and discharged. For example, the battery 960 may be a lithium ion secondary battery. The battery 960 may be provided inside the grip 900 or may be provided at a place other than the grip 900.

The vibration generation device 910 is bonded inside the grip 900. However, the vibration generation device 910 may be provided at any place where the vibration generation device 910 can vibrate the grip 900. With this configuration, the vibration generation device 910 can generate vibration in accordance with image capturing operation, and the vibration can be transferred to the entire hand of the image capturing person through the grip 900 so that the image capturing person can more easily feel the vibration.

1.4. Second Exemplary Application (Endoscope)

The technology of the present embodiment (the present technology) is also applicable to various products other than the above-described camera. For example, the technology of the present embodiment may be applied to an endoscope operation system.

Figure 12:
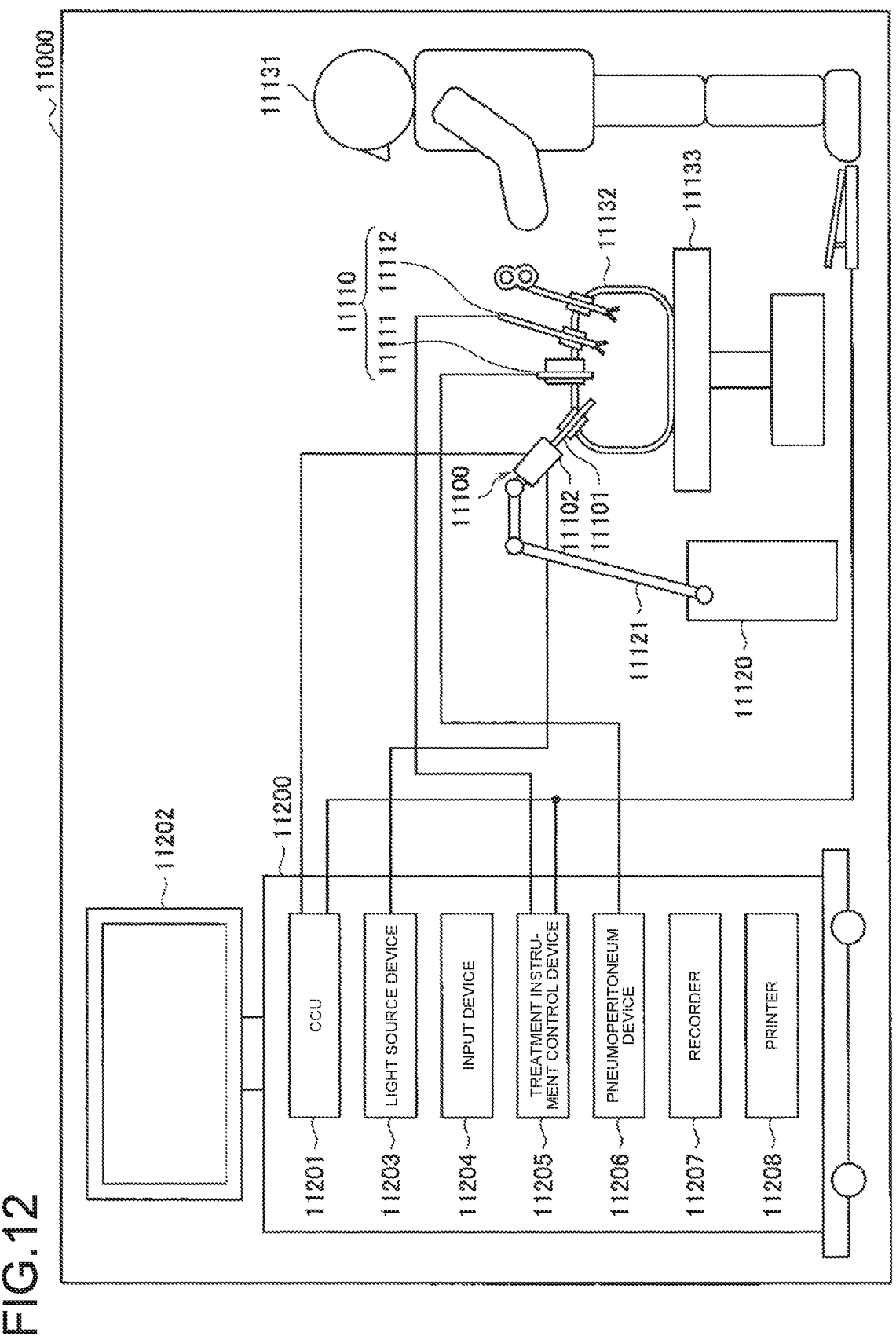
FIG. 12 is a diagram illustrating an exemplary schematic configuration of an endoscope operation system.

FIG. 12 is a diagram illustrating an exemplary schematic configuration of the endoscope operation system to which the technology of the present disclosure (the present technology) is applicable.

FIG. 12 illustrates a situation in which an operator (doctor) 11131 performs a medical operation on a patient 11132 on a patient bed 11133 by using this endoscope operation system 11000. As illustrated in FIG. 12, the endoscope operation system 11000 includes an endoscope 11100, other operation instruments 11110 such as a pneumoperitoneum tube 11111 and an energy treatment instrument 11112, a support arm device 11120 supporting the endoscope 11100, and a cart 11200 on which various devices for an endoscopic medical operation are mounted.

The endoscope 11100 includes a lens barrel 11101, a region of which extending from the leading end by a predetermined length is inserted into the body cavity of the patient 11132, and a camera head 11102 connected with the base end of the lens barrel 11101. In the illustrated example, the endoscope 11100 is configured as what is called a rigid scope including the lens barrel 11101 that is rigid, but may be configured as what is called a flexible scope including a flexible lens barrel.

An opening to which an objective lens is fitted is provided at the leading end of the lens barrel 11101. A light source device 11203 is connected with the endoscope 11100, and light generated by the light source device 11203 is guided to the leading end of the lens barrel 11101 by a light guide extending inside the lens barrel 11101 and is emitted toward an observation target in the body cavity of the patient 11132 through the objective lens. The endoscope 11100 may be a direct-view scope, an oblique-view scope, or a side-view scope.

An optical system and an image sensor are provided inside the camera head 11102, and reflected light (observation light) from the observation target is condensed onto the image sensor through the optical system. The observation light is photoelectrically converted by the image sensor, and an electric signal corresponding to the observation light, in other words, an image signal corresponding to an observation image is generated. The image signal is transmitted to a camera control unit (CCU) 11201 as RAW data.

The CCU 11201 includes a central processing unit (CPU) and a graphics processing unit (GPU), and collectively controls operation of the endoscope 11100 and a display device 11202. In addition, the CCU 11201 receives the image signal from the camera head 11102 and provides the image signal with various image processing, such as image development processing (demosaic processing), for displaying an image based on the image signal.

The display device 11202 displays, under control of the CCU 11201, an image based on the image signal provided with the image processing by the CCU 11201.

The light source device 11203 includes a light source such as a light emitting diode (LED) and supplies, to the endoscope 11100, irradiation light for image capturing of an operation site or the like.

An input device 11204 is an input interface for the endoscope operation system 11000. A user can input various kinds of information and instructions to the endoscope operation system 11000 through the input device 11204. For example, the user inputs an instruction to changes image capturing conditions (such as irradiation light kind, magnification, and focal length) of the endoscope 11100.

A treatment instrument control device 11205 controls drive of the energy treatment instrument 11112 for tissue cauterization, incision, blood vessel sealing, or the like. A pneumoperitoneum device 11206 feeds gas into the body cavity through the pneumoperitoneum tube 11111 so that the body cavity of the patient 11132 is inflated to obtain the visual field of the endoscope 11100 and a workspace for an operator. A recorder 11207 is a device capable of recording various kinds of information related to the medical operation. A printer 11208 is a device capable of printing various kinds of information related to the medical operation in various formats of text, image, graph, and the like.

The light source device 11203 that supplies irradiation light for image capturing of an operation site to the endoscope 11100 may be achieved by a white light source configured as, for example, an LED, a laser beam source, or a combination thereof. When the white light source is configured as a combination of RGB laser beam sources, the output intensity and output timing of each color (wavelength) can be highly accurately controlled, and thus the white balance of a captured image can be adjusted at the light source device 11203. In addition, in this case, an image corresponding to each of RGB can be captured in a time divisional manner by irradiating an observation target with laser beams from the respective RGB laser beam sources in a time divisional manner and controlling drive of the image sensors of the camera head 11102 in synchronization with the timings of irradiation. With this method, a color image can be obtained without providing color filters to the image sensors.

In addition, drive of the light source device 11203 may be controlled so that the intensity of output light is changed in every predetermined time. Drive of the image sensors of the camera head 11102 is controlled in synchronization with the timing of the light intensity change to acquire images in a time divisional manner. The images can be synthesized to generate a high dynamic range image without what are called underexposure and overexposure.

The light source device 11203 may be capable of supplying light in a predetermined wavelength band for special light observation. In the special light observation, for example, what is called narrow band light observation (narrow band imaging) is performed in which an image of a predetermined tissue such as a blood vessel on the surface layer of mucous membrane is captured at high contrast through irradiation with light in a band narrower than the band of irradiation light (in other words, white light) in normal observation by using the wavelength dependency of light absorption at a body tissue. Alternatively, in the special light observation, fluorescence observation may be performed in which an image is obtained by using fluorescence generated through irradiation with excitation light. In the fluorescence observation, for example, a body tissue is irradiated with excitation light to observe fluorescence from the body tissue (self-fluorescence observation), or a reagent such as indocyanine green (ICG) is locally injected into a body tissue and the body tissue is irradiated with excitation light corresponding to the fluorescence wavelength of the reagent to obtain a fluorescence image. The light source device 11203 may be capable of supplying the narrow band light and/or excitation light corresponding to such special light observation.

Figure 13:
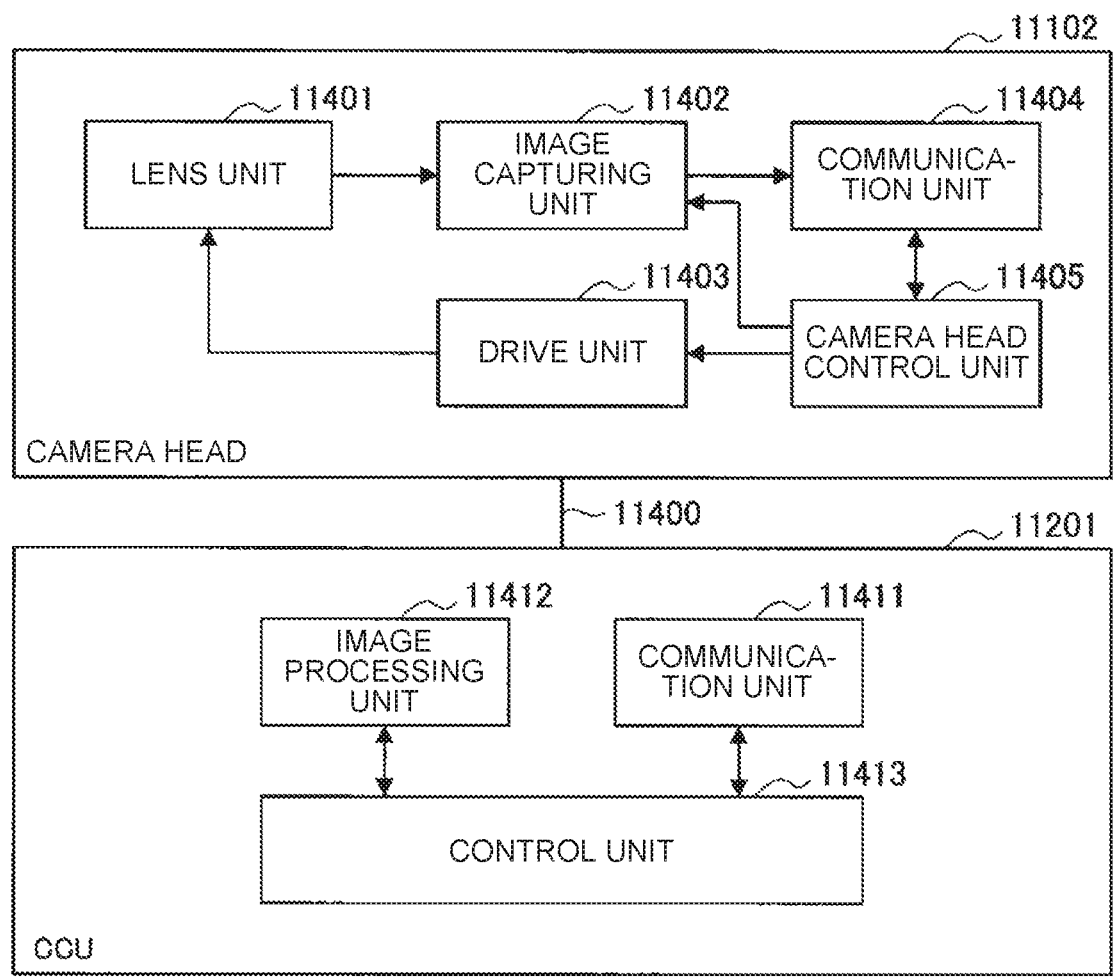
FIG. 13 is a block diagram illustrating exemplary functional configurations of a camera head and a CCU.

FIG. 13 is a block diagram illustrating exemplary functional configurations of the camera head 11102 and the CCU 11201 illustrated in FIG. 12.

The camera head 11102 includes a lens unit 11401, an image capturing unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are connected with each other through a transmission cable 11400 to perform communication therebetween.

The lens unit 11401 is an optical system provided at a connection part with the lens barrel 11101. The observation light acquired from the leading end of the lens barrel 11101 is guided to the camera head 11102 and incident on the lens unit 11401. The lens unit 11401 is formed by combining a plurality of lenses including a zoom lens and a focus lens.

The image capturing unit 11402 may include one image sensor (what is called a single-plate configuration) or a plurality of image sensors (what is called a multiple-plate configuration). When the image capturing unit 11402 has the multiple-plate configuration, for example, image signals corresponding to RGB may be generated by the respective image sensors and synthesized to obtain a color image. Alternatively, the image capturing unit 11402 may include a pair of image sensors for acquiring right-eye and left-eye image signals for 3D display, respectively. When 3D display is performed, the operator 11131 can more accurately understand the depth of a living body tissue at an operation site. When the image capturing unit 11402 has the multiple-plate configuration, a plurality of lens units 11401 can be provided for the respective image sensors.

The image capturing unit 11402 does not necessarily need to be provided to the camera head 11102. For example, the image capturing unit 11402 may be provided right after the objective lens inside the lens barrel 11101.

The drive unit 11403 is achieved by an actuator and moves each of the zoom and focus lenses of the lens unit 11401 along the optical axis by a predetermined distance under control of the camera head control unit 11405.

Accordingly, the magnification and focal point of an image captured by the image capturing unit 11402 can be adjusted as appropriate.

The communication unit 11404 is achieved by a communication device for communicating various kinds of information with the CCU 11201. The communication unit 11404 transmits an image signal acquired from the image capturing unit 11402 to the CCU 11201 through the transmission cable 11400 as RAW data.

The communication unit 11404 receives a control signal for controlling drive of the camera head 11102 from the CCU 11201, and supplies the control signal to the camera head control unit 11405. The control signal includes information related to image capturing conditions, such as information on specification of the frame rate of a captured image, information on specification of an exposure value at image capturing, and/or information on specification of the magnification and focal point of the captured image.

The above-described image capturing conditions such as the frame rate, the exposure value, the magnification, and the focal point may be specified by the user as appropriate or may be automatically set by the control unit 11413 of the CCU 11201 based on the acquired image signal. In the latter case, the endoscope 11100 has what are called an auto exposure (AE) function, an auto focus (AF) function, and an auto white balance (AWB) function.

The camera head control unit 11405 controls drive of the camera head 11102 based on the control signal received from the CCU 11201 through the communication unit 11404.

The communication unit 11411 is achieved by a communication device for communicating various kinds of information with the camera head 11102. The communication unit 11411 receives an image signal transmitted from the camera head 11102 through the transmission cable 11400.

The communication unit 11411 transmits a control signal for controlling drive of the camera head 11102 to the camera head 11102. The image signal and the control signal may be transmitted by electrical communication, optical communication, and the like.

The image processing unit 11412 performs various kinds of image processing on an image signal as RAW data transmitted from the camera head 11102.

The control unit 11413 performs various kinds of control related to image capturing of an operation site or the like by the endoscope 11100 and display of a captured image obtained through image capturing of an operation site or the like. For example, the control unit 11413 generates a control signal for controlling drive of the camera head 11102.

In addition, the control unit 11413 causes the display device 11202 to display a captured image of an operation site or the like based on the image signal on which the image processing is performed by the image processing unit 11412. In this case, the control unit 11413 may recognize various objects in the captured image by using various image recognition technologies. For example, the control unit 11413 detects the edge shape, color, and the like of each object included in the captured image to recognize for example, an operation instrument such as forceps, a particular living body site, bleeding, and mist when the energy treatment instrument 11112 is used. When causing the display device 11202 to display the captured image, the control unit 11413 uses a result of the recognition to display various kinds of operation support information on the image of the operation site in a superimposing manner. When the operation support information is displayed in a superimposing manner and presented to the operator 11131, a load on the operator 11131 can be reduced, and the operator 11131 can reliably perform a medical operation.

The transmission cable 11400 connecting the camera head 11102 and the CCU 11201 is an electric signal cable compatible with electric signal communication, an optical fiber compatible with optical communication, or a composite cable thereof.

In the illustrated example, communication is performed in a wired manner by using the transmission cable 11400, but communication between the camera head 11102 and the CCU 11201 may be performed in a wireless manner.

The above description is made on an example of the endoscope operation system to which the technology of the present embodiment is applicable. The technology of the present embodiment is applicable to the endoscope 11100 among the above-described components. With a vibration generation device according to the present embodiment, for example, at a timing when the endoscope 11100 performs image capturing, it is possible to notify a doctor of an image capturing timing by feeding back vibration to the doctor without affecting hand-shake correction control of the endoscope.

The above description is made on an example of an endoscope operation system, but the technology of the present disclosure may be applied to, for example, a microscope operation system.

Preferable embodiments of the present disclosure are described above in detail with reference to the accompanying drawings, but the technical scope of the present disclosure is not limited to such examples. Various changes and modifications could be thought of by a person having typical knowledge in the technical field of the present disclosure within the range of the technical idea written in the claims, and it should be understood that these changes and modifications belong to the technical scope of the present disclosure.

In the above-described embodiments, an image capturing device is a camera or an endoscope, but the present technology is not limited to such an example. For example, the image capturing device may be any electronic device having an image capturing function, such as a smartphone or a cellular phone. Alternatively, the image capturing device may be a digital video camera capable of capturing a moving image or the like.

Effects stated in the present specification are explanatory or exemplary but not restrictive. Thus, the technology according to the present disclosure achieves, together with or in place of the above-described effects, any other effect that is obvious to the skilled person in the art from description of the present specification.

Configurations as described below belong to the technical scope of the present disclosure.

(1)

A vibration generation device comprising:

a vibration unit configured to generate vibration; and a vibration control unit configured to perform vibration control on the vibration unit, wherein in accordance with image capturing operation of an image capturing device, the vibration control unit causes the vibration unit to generate vibration in a second frequency band different from a first frequency band that the image capturing device has as a vibration range used for hand-shake correction control.

(2)

The vibration generation device according to (1), wherein the vibration control unit controls a start timing of a vibration duration in which the vibration unit is caused generate vibration in accordance with an exposure duration until the image capturing device ends exposure since the image capturing device starts the exposure.

(3) The vibration generation device according to (2), wherein the vibration duration at least partially overlaps with the exposure duration.

(4) The vibration generation device according to (2), wherein the vibration duration includes the exposure duration.

(5) The vibration generation device according to (2), wherein the vibration duration is included in the exposure duration.

(6) The vibration generation device according to (1), wherein the vibration control unit acquires a control signal related to the vibration from the image capturing device and causes the vibration unit to generate vibration based on the control signal.

(7) The vibration generation device according to (6), wherein the control signal includes information instructing a start timing of a vibration duration in which the vibration unit is caused to generate vibration.

(8) The vibration generation device according to (6), wherein the control signal includes information instructing a frequency band in which the vibration unit vibrates.

(9) The vibration generation device according to (1), wherein the second frequency band is 150 Hz to 800 Hz.

(10) The vibration generation device according to (1), wherein the second frequency band is 200 Hz to 400 Hz.

(11) The vibration generation device according to (1), wherein the vibration unit includes a piezoelectric element.

(12) The vibration generation device according to any one of (1) to (11), wherein the vibration generation device is provided inside the image capturing device.

(13) The vibration generation device according to any one of (1) to (12), wherein a housing of the image capturing device has a resonance frequency in the second frequency band.

(14) The vibration generation device according to any one of (1) to (13), wherein the vibration generation device is built in a shutter button in the image capturing device.

(15) The vibration generation device according to any one of (1) to (13), wherein the vibration generation device is built in a grip in the image capturing device.

(16) A vibration generation method executed by a processor, the method comprising controlling, in accordance with image capturing operation of an image capturing device, a vibration unit at a second frequency band different from a first frequency band that the image capturing device has as a vibration range used for hand-shake correction control.

(17) A computer program configured to cause a computer to function as a vibration control device configured to output a vibration instruction at a second frequency band different from a first frequency band that an image capturing device has as a vibration range used for hand-shake correction control.

REFERENCE SIGNS LIST 100 vibration generation device
110 vibration unit
120 vibration control unit
200 image capturing device
210 input detection sensor
220 calculation control unit
230 input-output unit
240 hand-shake correction sensor
250 hand-shake correction controller
260 image sensor

The invention claimed is:

1. A vibration generation device, comprising:
a processor configured to:
generate vibration; and
control the vibration in accordance with image capturing operation of an image capturing device, wherein
a first frequency band corresponds to a vibration range used for hand-shake correction control in the image capturing operation,
the generated vibration in a second frequency band is feedback of the image capturing operation, and
the second frequency band is different from the first frequency band.

2. The vibration generation device according to claim 1, wherein
the processor is further configured to control a start timing of a vibration duration of the generated vibration in accordance with an exposure duration, and
the exposure duration is a time duration from a start of exposure of an image sensor to an end of the exposure of the image sensor.

3. The vibration generation device according to claim 2, wherein the vibration duration of the generated vibration at least partially overlaps with the exposure duration.

4. The vibration generation device according to claim 2, wherein the vibration duration of the generated vibration includes the exposure duration.

5. The vibration generation device according to claim 2, wherein the vibration duration of the generated vibration is included in the exposure duration.

6. The vibration generation device according to claim 1, wherein the processor is further configured to:
acquire a control signal related to the vibration from the image capturing device and
generate vibration based on the control signal.

7. The vibration generation device according to claim 6, wherein the control signal includes information of a start timing of a vibration duration.

8. The vibration generation device according to claim 6, wherein the control signal includes information of a frequency band for the vibration.

9. The vibration generation device according to claim 1, wherein the second frequency band is 150 Hz to 800 Hz.

10. The vibration generation device according to claim 1, wherein the second frequency band is 200 Hz to 400 Hz.

11. The vibration generation device according to claim 1, further includes a piezoelectric element.

12. The vibration generation device according to claim 1, wherein the vibration generation device is inside the image capturing device.

13. The vibration generation device according to claim 12, wherein a housing of the image capturing device has a resonance frequency in the second frequency band.

14. The vibration generation device according to claim 12, wherein the vibration generation device is in a shutter button in the image capturing device.

15. The vibration generation device according to claim 12, wherein the vibration generation device is in a grip in the image capturing device.

16. A vibration generation method executed by a processor, the method comprising:
controlling, in accordance with image capturing operation of an image capturing device, vibration, wherein
a first frequency band corresponds to a vibration range used for hand-shake correction control in the image capturing operation,
the vibration in a second frequency band is feedback of the image capturing operation, and
the second frequency band is different from the first frequency band.

17. A non-transitory computer-readable medium having stored thereon, computer-executable instructions which, when executed by a computer, cause the computer to execute operations, the operations comprising:
controlling, in accordance with image capturing operation of an image capturing device, vibration, wherein
a first frequency band corresponds to a vibration range used for hand-shake correction control in the image capturing operation,
the vibration in a second frequency band is feedback of the image capturing operation, and
the second frequency band is different from the first frequency band.

18. A vibration generation device, comprising:
a processor configured to:
generate vibration; and
control the vibration in accordance with image capturing operation of an image capturing device, wherein
a first frequency band corresponds to a vibration range used for hand-shake correction control in the image capturing operation,
the generated vibration in a second frequency band is feedback of the image capturing operation,
the second frequency band is different from the first frequency band, and
the second frequency band is one of 150 Hz to 800 Hz or 200 Hz to 400 Hz.

\* \* \* \* \*